United States Patent [19]

Maiville et al.

[11] Patent Number: 5,000,487
[45] Date of Patent: Mar. 19, 1991

[54] FRANGIBLE V-BAND COUPLING

[75] Inventors: Randolph L. Maiville, Onondaga; Rogers: Russell L., Munith, both of Mich.

[73] Assignee: Aeroquip Corporation, Jackson, Mich.

[21] Appl. No.: 438,240

[22] Filed: Nov. 20, 1989

[51] Int. Cl.⁵ ............................................. F16L 35/00
[52] U.S. Cl. ........................................ 285/2; 285/367
[58] Field of Search ................... 285/2, 3, 4, 367, 407, 285/408, 409, 410, 411

[56] References Cited

U.S. PATENT DOCUMENTS

| | | | |
|---|---|---|---|
| 2,602,678 | 7/1952 | Mahoff et al. | 285/367 X |
| 2,880,017 | 3/1959 | Anderson et al. | 285/409 X |
| 3,455,582 | 7/1969 | Von Hoevel | 285/367 X |
| 4,469,354 | 9/1984 | Caldwell | 285/2 |

Primary Examiner—Dave W. Arola
Attorney, Agent, or Firm—Beaman & Beaman

[57] ABSTRACT

A frangible, circumferentially contractible clamp operated by a band constricting actuator for securing a pair of flange end pipe members in aligned end-to-end relation. The clamp includes a band consisting of retainer halves which are fastened together by frangible fasteners to form an envelope adapted to embrace and secure the aligned flanges together upon tightening of the actuator. Upon the associated pipes being subjected to exceptional tensile or bending forces, the fasteners will fracture permitting the retainer halves to separate to allow the flanges to separate and prevent the pipes from being damaged.

3 Claims, 1 Drawing Sheet

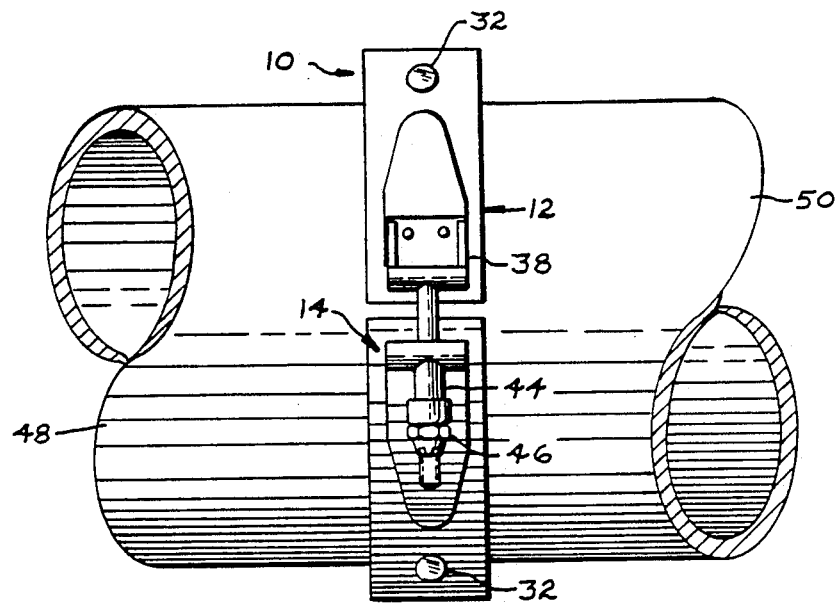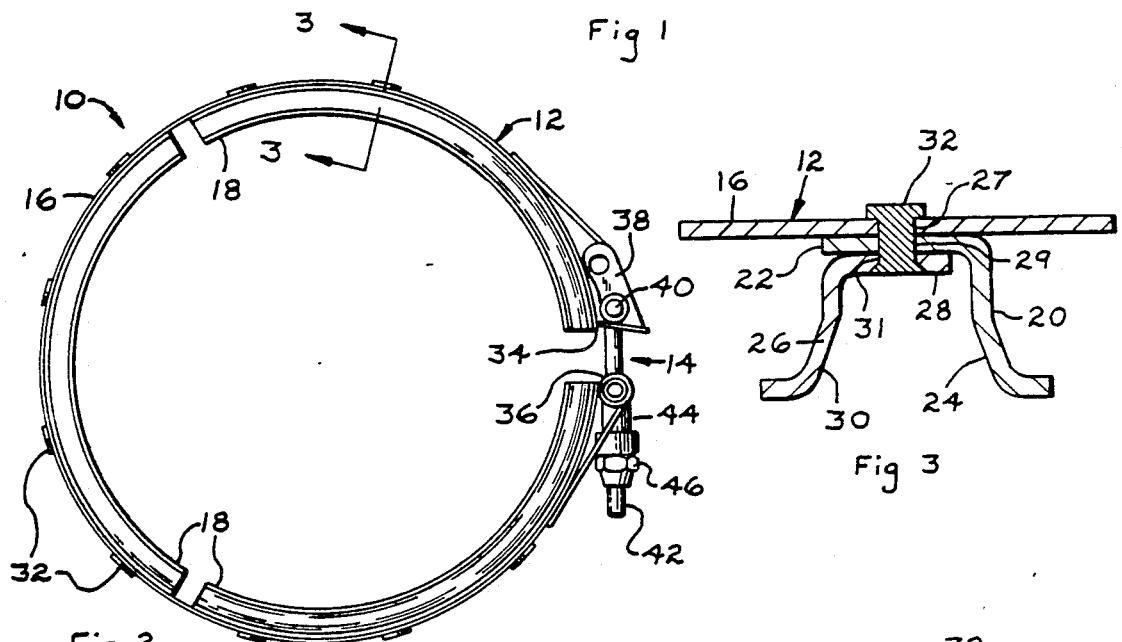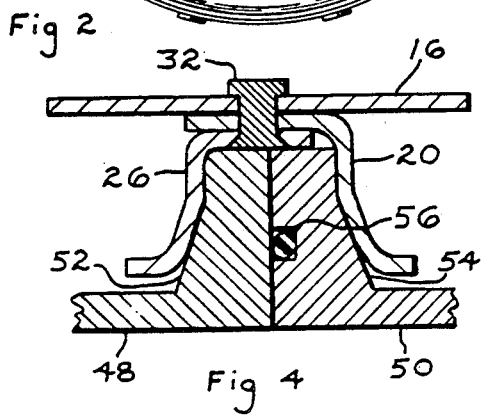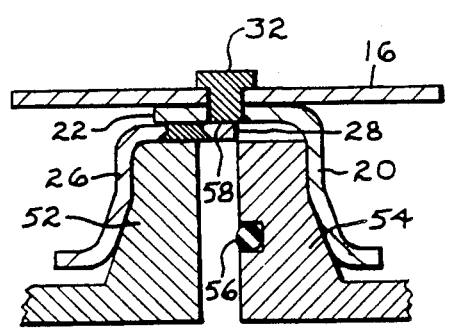

FRANGIBLE V-BAND COUPLING

BACKGROUND OF THE INVENTION

Circumferentially contractible clamps are widely used to clamp pipe members or the like in aligned end-to-end relation. Such clamps usually consist of a band or strap adapted to encircle the end flanges of the pipe members to be connected and an actuator located on the ends of the band to facilitate contraction and expansion of the band. Tightening of the actuator draws the ends of the band toward each other constricting the band about the flanges to provide the effective clamping forces necessary to maintain the pipes together. Typical examples of these types of clamps are shown in U.S. Pat. Nos. 4,563,795; and 4,739,542.

The aforementioned clamps are relatively inexpensive to manufacture, simple to use, and are dependable under heavy loading conditions. However, such clamps are often utilized with pipes which are not as durable as the clamps, and upon the pipes being subjected to exceptional bending or tensile forces, it is known for the clamps to maintain the flanges together while the pipes themselves have fractured or sustained extensive damage rendering them permanently useless. Preferably, since the pipes are more expensive than the clamp, upon the pipes being subjected to exceptional loading conditions the clamp itself should release allowing the pipes to separate without damage, but heretofore, a clamp of this type has not been available for use.

It is an object of the invention to provide a circumferentially contractible clamp for securing a pair of pipe members in aligned end-to-end relation wherein the clamp is dependable under heavy loading conditions, yet upon the pipes being subjected to exceptional tensile or bending forces, the clamp will fracture releasing the pipe ends to prevent the pipes from being damaged.

Another object of the invention is to provide a frangible, contractible clamp having a band adapted to encircle aligned flange pipe ends and a band constricting actuator for circumferentially contracting the band wherein the band consists of retainer elements fastened together by frangible fasteners which will fracture upon a predetermined axial loading condition imposed on the clamp causing the band to disengage the flange to allow the pipes to separate without damage.

Yet another object of the invention is to provide a frangible, circumferentially contractible clamp which is capable of fracturing upon being subjected to predetermined axial loading conditions wherein the clamp is of economical manufacture, dependable in operation, and simple and efficient to use.

In the practice of the invention the frangible clamp includes a band adapted to embrace end flanges of a pair of pipe members to be connected and a band constricting actuator to facilitate contraction and expansion of the band. The band includes a generally circular outer strap and a plurality of inner arcuate segments, and the segments consist of a pair of retainer halves each having a base and a flare portion depending from the base adapted to engage the flange end of one of the pipes. The retainer halves are fastened together at their bases by frangible fasteners in the form of rivets whereby the flare portions extend in a common direction defining an envelope conforming to the opposed flanges, and the same fasteners are also utilized to mount the retainer halves to the outer strap.

In use, the clamp is positioned on the opposed flanges and the actuator is tightened until the desired band constriction is achieved, in which case each of the flares abut with one of the pipe flanges to secure the flanges together. Under normal operating conditions the frangible fasteners are of sufficient strength to maintain the retainer halves together and secure the pipes in end-to-end relation, but upon the pipe members being subjected to exceptional bending or tension forces the frangible fasteners will fracture permitting the retainer halves to separate and disengage the flanges. This permits the flanges to separate cleanly and prevents the pipes from sustaining serious damage possibly rendering them permanently useless.

BRIEF DESCRIPTION OF THE DRAWINGS

The aforementioned objects and advantages of the invention will be appreciated from the following description and accompanying drawings wherein:

FIG. 1 is a partial, elevational view of a pair of flange end pipe members being connected together by a clamp constructed in accord with the invention, FIG. 2 is a side elevational view of the clamp, per se, of FIG. 1, FIG. 3 is an enlarged, detail, sectional view taken through the band along Section 3—3 of FIG. 2, FIG. 4 is a view similar to FIG. 3 illustrating the fastened retainer halves receiving a pair of aligned flange pipe ends, and FIG. 5 is a view similar to FIGS. 3 and 4 illustrating the early stages of separation of the retainer halves upon fracture of the rivet fasteners.

DESCRIPTION OF THE PREFERRED EMBODIMENT

A frangible, circumferentially contractible clamp constructed in accord with the inventive concepts is disclosed in the drawings generally indicated at 10. The clamp 10 includes a band 12 adapted for receiving abutting pipe or conduit end flanges and a band constricting actuator assembly 14 mounted on the band to facilitate contraction and expansion of the band about the flanges for releasably connecting the pipe members together. The band 12 includes a generally circular outer strap 16 and a plurality of inner arcuate segments 18, and each of the segments 18 consist of a pair of retainers halves mounted to the strap 16 by frangible fasteners to form an integral unit.

In FIGS. 3-5, the sectional view taken through the band 12 illustrates the cross-sectional configuration of the retainers as well as how the retainers are mounted to the strap 16. The retainer 20 has a base 22 and a flare 24, while the retainer 26 has a base 28 and a flare 30. The bases 22 and 28 are abutted in an overlapping relation whereby the flares 24 and 30 extend in a common direction defining an envelope adapted to embrace a pair of opposed pipe flanges. The strap 16 has a generally flat cross section and circumferentially engages the overlapping base 22, and circumferentially spaced holes 27 provided at desired locations about the strap 16 align with holes 29 and 31 formed in the bases 22 and 28 to receive a frangible fastener to mount the retainers to the strap. Preferably, the frangible fastener is in the form of a rivet 32, but the fastener may take the form of a screw, pin or the like.

The band 12 includes ends 34 and 36 whereon the actuator assembly 14 is mounted. The assembly consist of a saddle 38 mounted on the end 34, and a T-shaped bolt 40 pivotally mounted on the saddle having a threaded shaft 42 adapted to be received in a trunnion 44 mounted on the band end 36. A threaded nut 46 having wrench engaging surfaces defined thereon is mated on the shaft 42 whereby a wrench may be applied for rotating the nut to draw the ends 34 and 36 toward each other to produce the band contraction forces.

By way of example, the clamp 10 is used to maintain the assembly of pipe or conduit members 48 and 50, FIGS. 1, 4 and 5. The pipe member 48 has a radially outwardly extending flange 52 and the pipe member 50 has a radially outwardly extending flange 54. Each of the flanges 52 and 54 has a flat end adapted to abut with one another and an outer tapered surface whereby when the flat ends are abutting the tapered surfaces form a configuration receivable by the fastened retainers 20 and 26 as appreciated in FIG. 4. Upon abutting the pipe members in an end-to-end relation, the aligned flanges 52 and 54 are received by the band 12 and contraction of the band by tightening of the nut 46 produces radial and axial forces on the pipe ends due to the tapered surfaces and configuration of the flanges drawing the flanges toward each other into a sealing engagement with and an 0 ring 56, FIG. 4, mounted in flange 54.

To use the clamp of the invention, initially, the nut 46 will be rotated to the end of the shaft 42 permitting the band ends 34 and 36 to separate and the clamp to open sufficiently permitting placement of the clamp about the pipes 48 and 50. Upon the clamp being located as desired upon the pipe ends, rotating the nut 46 by a wrench, not shown, or the like, translates the bolt 40 and draws the ends of the band toward each other circumferentially tensioning the clamp whereby the fastened retainers 20 and 26 secure the flanges 52 and 54 together, FIG. 4. The clamp 10 may be easily removed from the flanges by simply loosening the nut 46 permitting the clamp to expand and release the flanges.

When the clamp 10 is in the operative condition as described above, effective clamping forces are produced to maintain the pipes connected under normal load conditions. However, should the pipes be subjected to exceptional tensile or bending forces, the forces imparted on the clamp will cause the rivets 32 to fracture or shear, as indicated at 58, FIG. 5. This shearing of the rivets permits the retainers 20 and 26 to separate from one another and from the strap 16 allowing the flanges 52 and 54 to separate as illustrated in FIG. 5 to prevent the pipes from fracturing or sustaining serious damage possibly rendering them useless.

The retainers may be mounted together by welding processes or other similar methods rather than by using frangible fasteners such as the rivets, whereby the welds would fracture under exceptional forces imposed on the pipes allowing the retainers to separate in the same manner as when the rivets 32 shear. The band 12 may include only one arcuate segment 18 mounted to the strap 16 rather than a plurality of segments, in which case each of the retainers 20 and 26 may circumferentially extend slightly less than a full 360°, and the strap 16 may be eliminated. Also, it should be noted that the clamp 10 is not limited to a nut and bolt type actuator, but the actuator may take any one of the several forms of actuators known in the contractible clamp art.

It is to be appreciated that various modifications to the inventive concepts may be apparent to those skilled in the art without departing from the spirit and scope of the invention.

What is claimed is:

1. A frangible, circumferentially contractible clamp for connecting aligned, flanged conduit ends with respect to one another comprising, in combination, a generally circular band defining a central longitudinal axis and having ends disposed adjacent to each other, circumferential adjustable means defined on said band ends adapted to draw said ends toward each other constricting said band, said band including first and second members each having a base and a flare depending therefrom, frangible means directly attaching said members together in abutment with each other at said bases and simultaneously fastening said members relative to said band and each other whereby said flares extend in a common direction defining spaced opposed abutment sides extending inwardly adapted to receive and secure the aligned flanges together, said frangible means fracturing upon said clamp being subjected to predetermined axial load conditions causing said opposed abutment sides to separate releasing the joined flanges.

2. A frangible, circumferentially contractible clamp for connecting aligned, flanged conduit ends with respect to one another comprising, in combination, a generally circular band defining a central longitudinal axis and having ends disposed adjacent to each other, circumferential adjustable means defined on said band ends adapted to draw said ends toward each other constricting said band, said band having a transverse cross sectional configuration including a pair of interconnected axially spaced opposed abutment sides extending inwardly adapted to receive and secure the aligned flanges together, and frangible means defined on said band interconnecting said abutment sides to maintain the assembly thereof, said frangible means fracturing upon said clamp being subjected to predetermined axial load conditions causing said opposed abutment sides to separate releasing the joined flanges, said band including first and second members each having a base and a flare depending therefrom, said frangible means fastening said members together at said bases whereby said flares extend in a common direction defining said opposed abutment sides, said bases being overlapped in an abutting relation, said frangible means comprising rivets passing through said overlapping bases perpendicular to said longitudinal axis.

3. In a frangible, contractible clamp as in claim 2, said band further comprising a generally circular outer strap encompassing said overlapping bases, said rivets fastening said bases to said strap.

* * * * *